(12) United States Patent
Jang et al.

(10) Patent No.: US 7,896,389 B2
(45) Date of Patent: Mar. 1, 2011

(54) AUTOMOBILE SIDE AIRBAG GUIDE PLATE

(75) Inventors: Myung-ryun Jang, Gyeonggi-do (KR);
Tae-woo Kim, Gangwon-do (KR);
Eun-hwan Oh, Gangwon-do (KR);
Byong-sun Yoo, Seoul (KR); Dong-jun Lee, Gangwon-do (KR); Kyun-soon Choi, Jeoliabuk-do (KR); Jung-han Kim, Gangwong-do (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/556,684

(22) Filed: Sep. 10, 2009

(65) Prior Publication Data
US 2010/0025973 A1 Feb. 4, 2010

Related U.S. Application Data

(62) Division of application No. 11/544,169, filed on Oct. 6, 2006, now Pat. No. 7,607,685.

(30) Foreign Application Priority Data

| Oct. 7, 2005 | (KR) | 10-2005-0094286 |
| Nov. 1, 2005 | (KR) | 20-2005-0030971 U |
| Apr. 4, 2006 | (KR) | 20-2006-0008880 U |
| Apr. 18, 2006 | (KR) | 20-2006-0010368 U |

(51) Int. Cl.
*B60R 21/20* (2006.01)

(52) U.S. Cl. .................................. 280/730.2
(58) Field of Classification Search ............. 280/728.2, 280/730.2, 743.1
See application file for complete search history.

(56) References Cited

U.S. PATENT DOCUMENTS

| 6,254,123 | B1 * | 7/2001 | Urushi et al. ............... 280/730.2 |
| 6,305,707 | B1 * | 10/2001 | Ishiyama et al. ............ 280/730.2 |
| 6,361,069 | B1 | 3/2002 | Saito et al. |
| 6,530,594 | B1 | 3/2003 | Nakajima et al. |
| 6,974,151 | B2 * | 12/2005 | Ochiai et al. ............... 280/728.2 |
| 7,722,074 | B2 * | 5/2010 | Sugimoto ................... 280/728.2 |
| 2001/0040360 | A1 | 11/2001 | Ishiyama et al. |
| 2003/0006590 | A1 | 1/2003 | Aoki et al. |
| 2003/0006591 | A1 | 1/2003 | Yasuhara et al. |
| 2005/0134027 | A1 | 6/2005 | Noguchi et al. |
| 2005/0173902 | A1 * | 8/2005 | Boxey ........................ 280/730.2 |
| 2006/0082108 | A1 * | 4/2006 | Wahara et al. .............. 280/730.2 |

* cited by examiner

*Primary Examiner* — Paul N Dickson
*Assistant Examiner* — Robert A Coker
(74) *Attorney, Agent, or Firm* — Brinks Hofer Gilson & Lione

(57) ABSTRACT

Provided is an automobile side airbag guide plate including support brackets disposed at both sides of a center pillar, fixed to an inner panel between a roof panel and a head liner, and supporting a lower part of an airbag module, wherein each of the support brackets includes a vertical part fixed to the inner panel between the roof panel and the head liner, and a horizontal support part extending from the vertical part to support the lower part of the airbag module fixed to the inner panel.

11 Claims, 18 Drawing Sheets

(a)

AUTOMOBILE SIDE AIRBAG GUIDE PLATE

RELATED APPLICATION

This is a division of U.S. patent application Ser. No. 11/544,169, filed on Oct. 6, 2006, now U.S. Pat. No. 7,607,685, issued on Oct. 27, 2009, the entire contents of which is hereby incorporated by reference.

BACKGROUND OF THE INVENTION

1. Field of the Invention

The present invention relates to an automobile side airbag guide plate, and more particularly, to an automobile side airbag guide plate enabling stable deployment of a side airbag installed between a roof panel and a head liner into the automobile upon collision.

2. Description of the Prior Art

An automobile airbag, like a safety belt, is a device for protecting a driver/passenger from injury in a collision.

Airbags may be installed in the steering wheel in front of the driver seat, in the glove box in front of the passenger seat, and at both sides of the automobile, i.e., between head liners adjacent to doors and roof panels. The airbags, along with safety belts, function using a collision detection sensor and an electronic control unit (ECU) to protect passengers in a collision.

In a collision, the collision detection sensor outputs a detection signal to the ECU, the ECU activates the airbag, and the airbag is then inflated by an inflator.

The inflator is connected to the airbag, which is initially in a folded state, and is operated by the ECU. A built-in heater heats up to ignite gunpowder and instantly combust a gas generation agent such that a large amount of nitrogen gas (hereinafter, referred to simply as "gas") is rapidly injected into the airbag to expand the airbag.

Thus, the airbag inflates upon collision to protect the driver and passengers) from impact to the head and upper torso.

The side airbags function to prevent injury due to impact against doors of the automobile in a sideways collision, which will be described with reference to FIGS. 1 and 2.

As shown in FIG. 1, a side airbag 10 (hereinafter, referred to as an "airbag module") is installed to be deployed toward a center pillar, i.e., a B-pillar installed between a roof panel (not shown), and a head liner 4.

The airbag module 10 includes an inflator 20 installed therein and controlled by an ECU (not shown) depending on collision intensity to inject a large amount of gas into an airbag tube 16.

Referring to FIG. 2, a plurality of inner panels 6 and reinforcement brackets 8 installed between the roof panel and the head liner 4. The head liner 4 includes a door trim and a center pillar 2 installed adjacent to each other.

That is, the head liner 4 has a threshold 4a stepped toward the inner panels 6. The threshold 4a is installed adjacent to an upper end of the center pillar 2.

As described above, the airbag module 10 is installed adjacent to the head liner 4 and the center pillar 2.

The airbag module 10 is installed at one side of a housing 12, i.e., a mounting part 12a is bolted to the inner panel 6, and an airbag tube 16 is disposed in the housing 12 in a folded state. A door 12b is installed at one side of the housing 12 to be opened by the airbag tube 16.

Specifically, the door 12b opened by the airbag tube 16 is detached from the housing 12 at its upper end when the airbag rube 12b is deployed, and then is rotated to be in contact with an upper end of the center pillar 2, thereby blocking a space between the center pillar 2 and the inner panel 6 to stably guide deployment of the airbag tube 16.

In addition, since the center pillar 2 in contact with the head liner 4 includes a seat belt (not shown) installed therein such that the center pillar 2 projects inward from the automobile, it is possible to prevent the airbag tube 16 from entering into a space between the center pillar 2 and the inner panel 6 when the airbag tube 16 is deployed.

In addition, a guide plate 14 is installed at a lower surface of the housing 12, i.e., a surface adjacent to the center pillar 2, such that the airbag tube 16 is deployed to be in contact with the inner panel 6 and control rotation of the lower surface of the housing 12 to put the door 12b in stable contact with the center pillar 2.

That is, the airbag tube 16 is deployed such that the lower surface of the housing 12 is pushed downward at the same time the upper end of the door 12b is detached from the housing 12. At this time, the housing 12 and the guide plate 14 are in contact with the inner panel 6 to control rotation of the lower surface of the housing 12, and the door 12b is in stable contact with the upper end of the center pillar 2 to block a space between the center pillar 2 and the inner panel 6, thereby preventing the airbag tube 16 from entering into the space.

Therefore, as shown in FIG. 2 with an imaginary line, the airbag tube 16 is stably deployed into the automobile, not into the space between the center pillar 2 and the inner panel 6, by blocking the space between the center pillar 2 and the inner panel 6 using the guide plate 14 and the door 12b of the housing 12, thereby effectively protecting the side of the head and upper torso.

Here, as shown by the imaginary line of FIG. 2, the head liner 4 has an opening line separated from the upper end of the center pillar 2 by the door 12b so that the airbag tube 16 is discharged through the opening and deployed into the automobile.

Meanwhile, since the airbag tube 16 inflates at a high speed and under high pressure, the head liner 4 guides deployment of the airbag tube 16 along the opening line.

However, the head liner 4 is sequentially opened from a rear end, at which the inflator 20 is disposed, to a front end of the automobile, together with deployment of the airbag tube 16.

At this time, the opening line of the head liner 4 projects more than an initial installation position from the center pillar 2 into the interior of the automobile, and is depressed less than an initial installation position from both sides of the center pillar 2 into the chassis, i.e., the inner panel 6. As a result, the head liner 4 around the center pillar 2 cannot be smoothly opened thereby hindering smooth deployment of the airbag tube 16 and endangering the driver/passenger.

The guide plate 14 is also a very important component of the airbag module 10 which may determine survival of the driver/passenger in a collision. However, since the guide plate 14 rotated with the lower surface of the housing 12 has a simple plate shape which is not very strong, it may be broken due to gas pressure when the airbag tube 16 is deployed, rather than being in contact with the inner panel 6 to absorb shock In this case, the door 12b formed of a thin film collides with the upper end of the center pillar 2 and is damaged or folded and inserted between the center pillar 2 and the inner panel 6. As a result, the deployed airbag tube 16 may enter into a space between the center pillar 2 and the inner panel 6, thereby failing to prevent injury of the driver/passenger.

In addition, since the guide plate 14 has a simple plate structure which is not very strong, when the airbag tube 16 is deployed, the guide plate 14 may be rotated with the lower surface of the housing 12 by gas pressure, thereby contacting the inner panel 6 and sustaining damage.

As a result, the deployed airbag tube 16 may enter between the center pillar 2 and the inner panel 6 and thus fail to perform its function of protecting the driver/passenger. Further, it is not possible to replace a broken guide plate 14.

The airbag module installed at the side of the automobile along the entire side part of a roof liner is generally referred to as a "side airbag" or "curtain air bag."

Another problem with the side airbag is that an inner guide may be deformed due to external impact, and since there is no auxiliary guide member at both sides of the side airbag, deployment of the airbag may be obstructed.

SUMMARY OF THE INVENTION

An object of the present invention is to provide an automobile side airbag guide plate enabling rapid and stable deployment of an airbag tube into the automobile, by forming a support bracket for supporting an airbag module between a roof panel and a head liner and rapidly opening the head liner using the support bracket when the airbag tube is deployed, thereby protecting a driver/passenger from injury by banging against the side of the automobile in a collision.

Another object of the present invention is to provide an automobile side airbag guide plate enabling rapid and stable deployment of an airbag tube into the automobile to protect the driver/passenger from injury in a collision, by forming a shock absorption part formed of an air layer, rather than a guide plate, at a lower surface of an airbag housing to prevent damage of the airbag housing when the airbag tube is deployed.

Still another object of the present invention is to provide an automobile side airbag guide plate capable of supporting a lower surface of an airbag housing, and rapidly and stably guiding an airbag tube into the automobile when the airbag tube is deployed.

Yet another object of the present invention is to provide an automobile side airbag guide plate capable of obtaining a more stable deployment angle of a door of an airbag housing on initial deployment of an airbag tube through a bent part formed at a bottom surface of a guide plate, and absorbing impact using the bent part.

Yet another object of the present invention is to provide an automobile side airbag guide plate enabling orderly deployment of a side airbag without interference by a center pillar.

An aspect of the invention provides an automobile side airbag guide plate including: support brackets disposed at both sides of a center pillar, fixed to an inner panel between a roof panel and a head liner, and supporting a lower part of an airbag module, wherein each of the support brackets comprises: a vertical part fixed to the inner panel between the roof panel and the head liner; and a horizontal support part having a hollow part and extending from the vertical part to support the lower part of the airbag module fixed to the inner panel.

Another aspect of the invention provides an automobile side airbag guide plate including an airbag housing having an airbag tube and a door, wherein the airbag tube is installed in the airbag housing and disposed at a boundary between the center pillar and the head liner, the door is opened at one side by the deployed airbag tube, a hollow shock absorption part is formed under the door of the airbag housing, and a wrinkle part is installed at one side of the shock absorption part to compress the shock absorption part when the airbag tube is deployed.

Still another aspect of the invention provides an automobile side airbag guide plate including an airbag housing having an airbag tube, a door, and a guide plate, wherein the airbag tube is installed in the airbag housing and disposed at a boundary between a center pillar and a head liner, the door is opened at one side by the deployed airbag tube, the guide plate is fixed to an inner panel at its one side using a fixing means, and the guide plate has a support part bent from a lower end thereof to support a lower surface of the airbag housing.

Yet another aspect of the invention provides an automobile side airbag guide plate including a fixing member having an installation hole into which a bolt is fastened, a support part bent from a lower end of the fixing member, and an extension part extending from the support part.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF EXEMPLARY EMBODIMENTS

First Exemplary Embodiment

Hereinafter, a first exemplary embodiment of the present invention will be described with reference to FIGS. 3 to 6.

Figure 1:
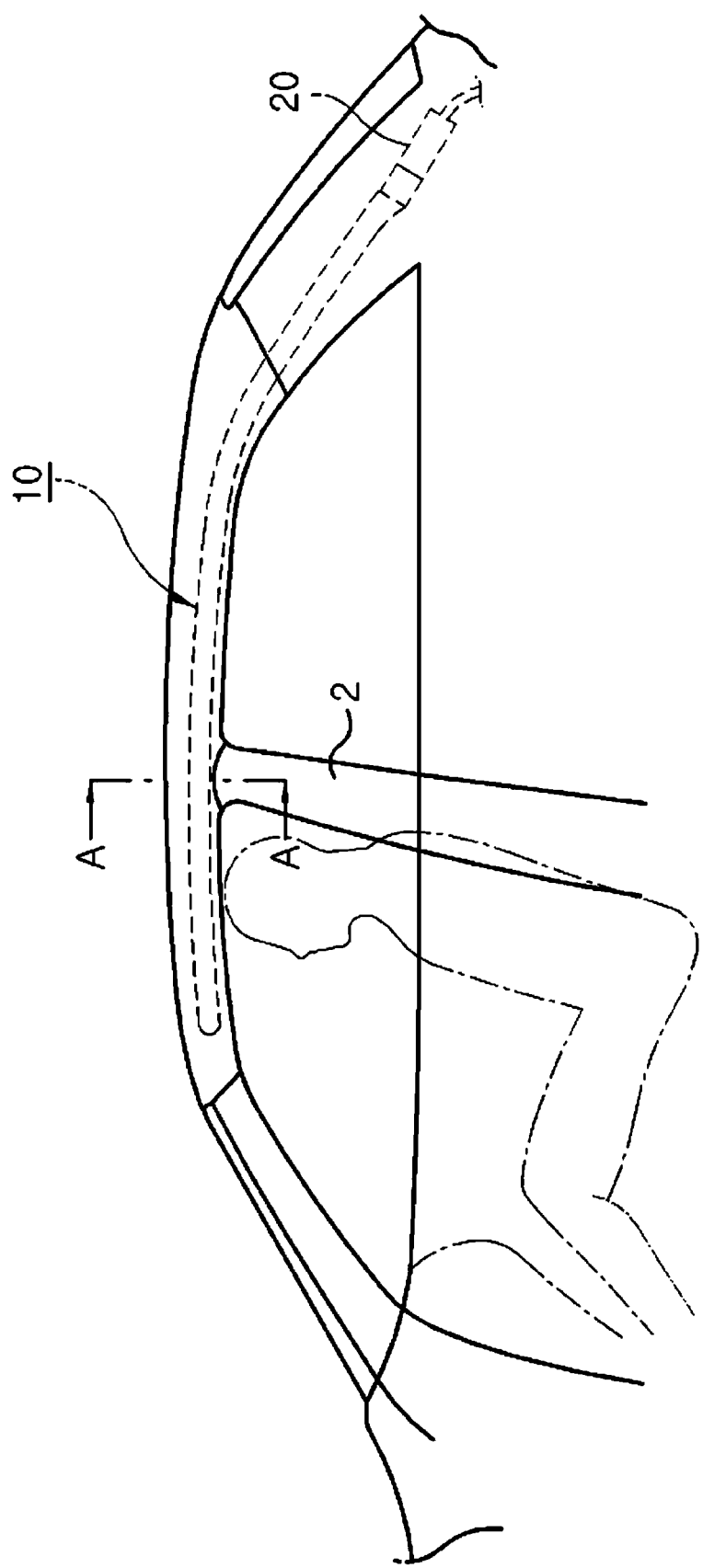
FIG. 1 is a schematic view of a conventional side airbag of an automobile.
Figure 2:
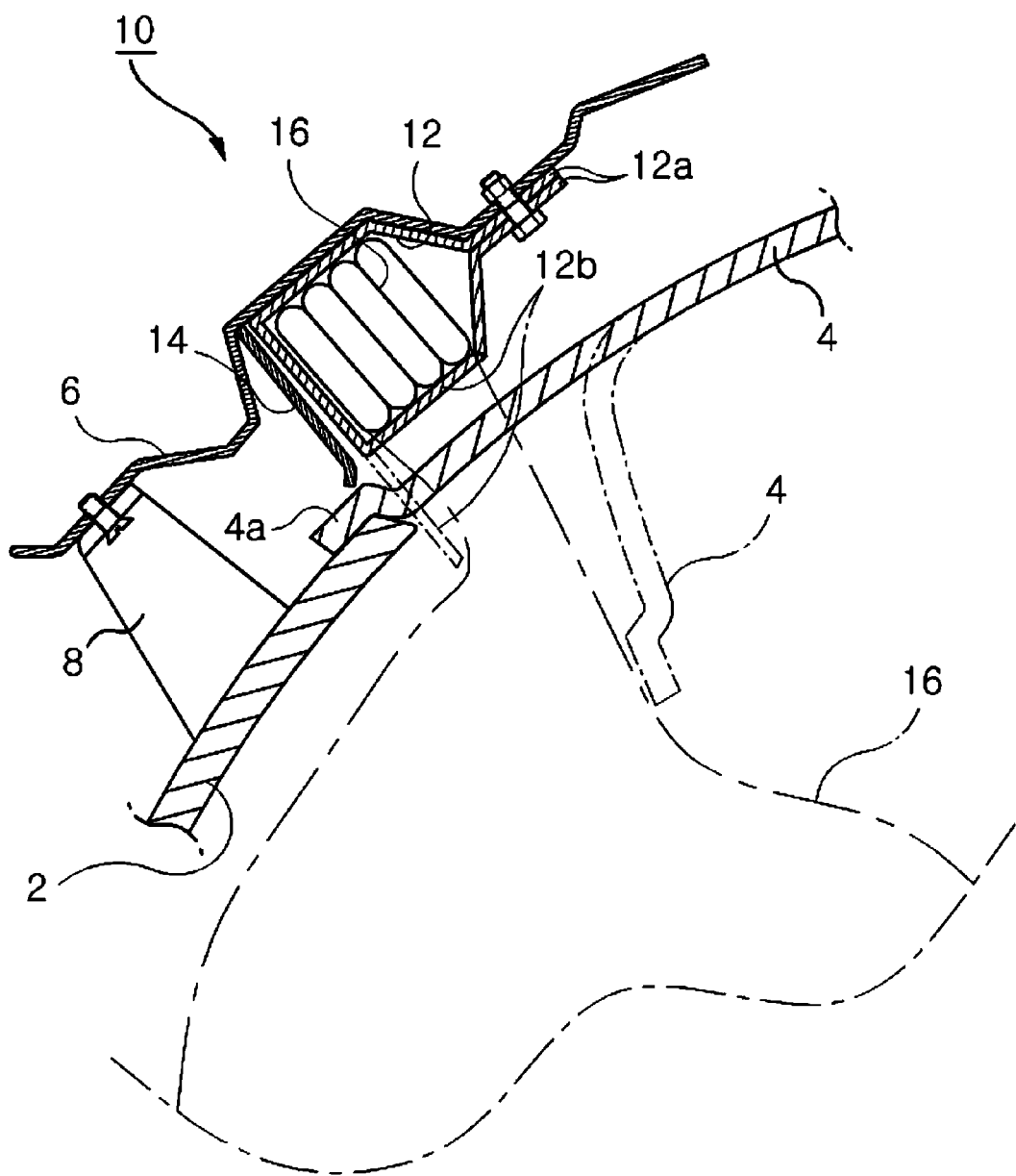
FIG. 2 is a cross-sectional view taken along the line A-A of FIG. 1.
Figure 3:
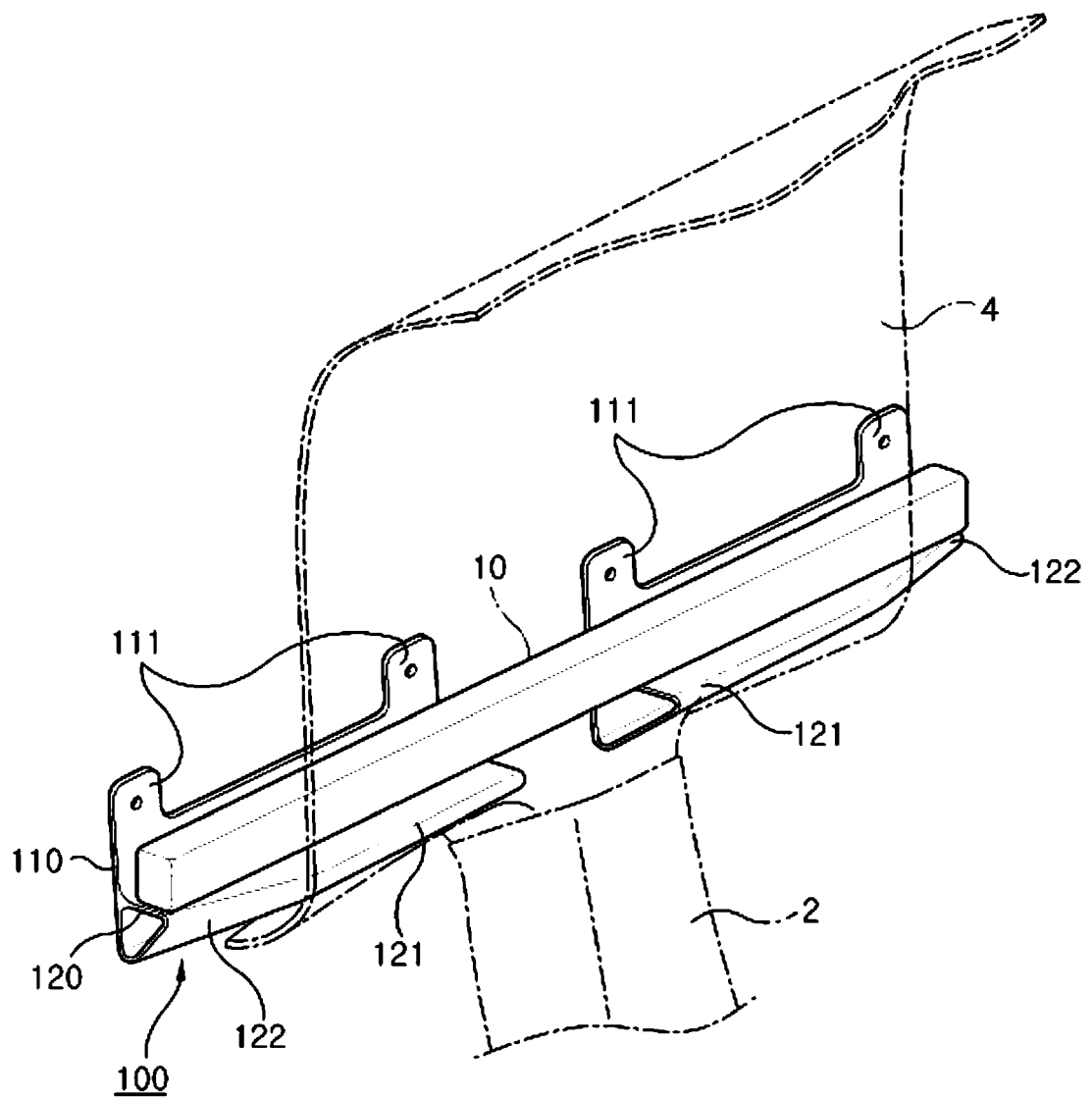
FIG. 3 is a perspective view of a side airbag guide plate in accordance with a first exemplary embodiment of the present invention.

As shown in FIG. 3, an airbag module 10 in accordance with the present invention is supported at its lower surface by a support bracket 100 fixed to an inner panel 6 between a roof panel (not shown) and a head liner 4.

Since the airbag module 10 is similar to the conventional art, a detailed description thereof will be omitted. Hereinafter, a pair of support brackets 100 not found in the conventional art will be described in detail.

The pair of support brackets 100 are disposed at both sides of a center pillar 2 and fixed to an inner panel 6 disposed between a roof panel and a head liner 4. The fixed support brackets 100 have a length corresponding to an inner side body of the automobile.

Figure 4:
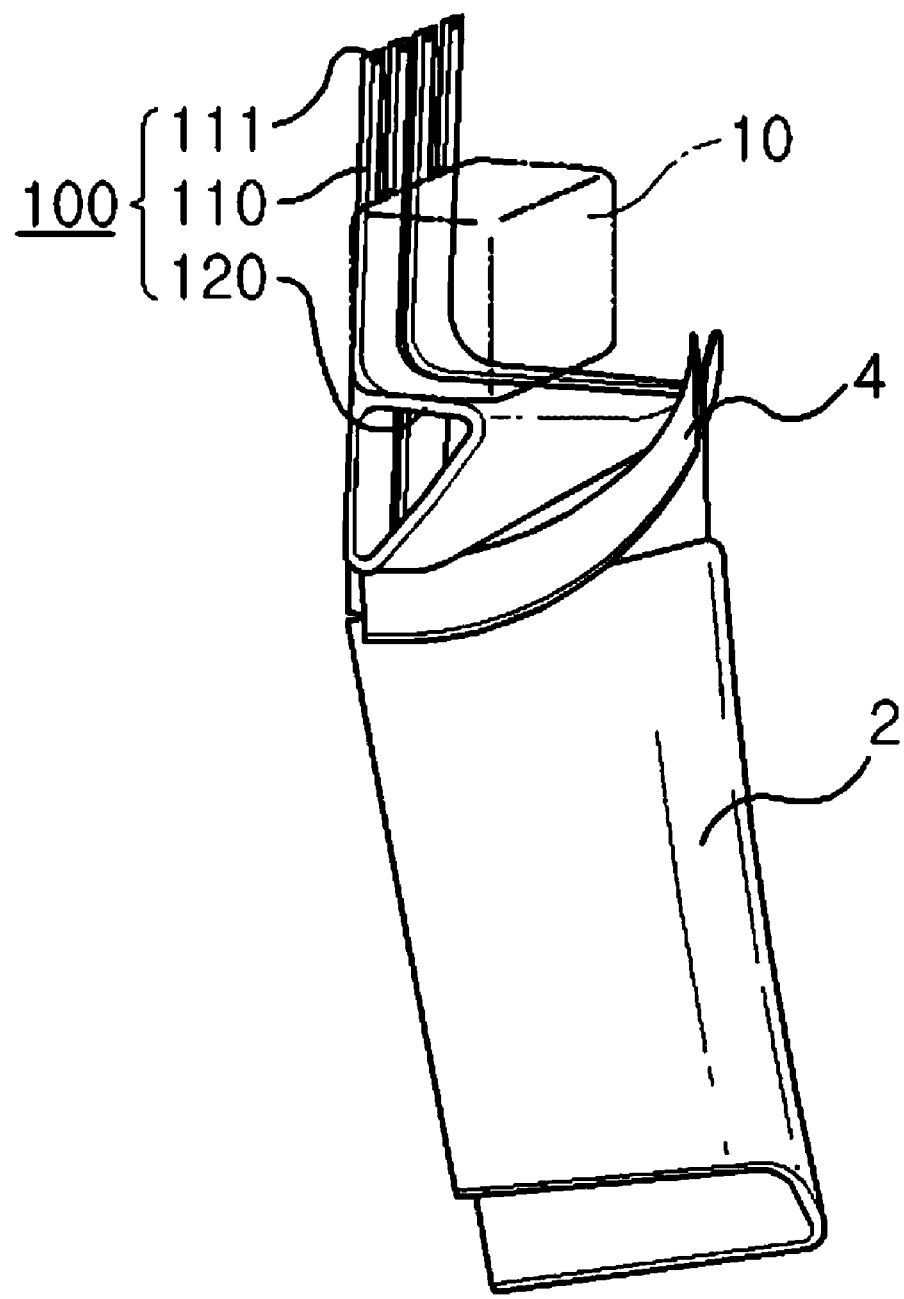
FIG. 4 is a side view of the side airbag guide plate of FIG. 3.

As shown in FIG. 4, the support bracket 100 has an approximate "L" shape, which includes a vertical part 110 and a horizontal support part 120.

The vertical part 110 contacts the inner panel 6 between the roof panel and the head liner 4 and is bolted to the inner panel 6 through mounting parts 111 at its upper end. The horizontal support part 120 having a hollow part horizontally extends from the vertical part 110 to support a lower surface of an airbag module 10 fixed to the inner panel 6.

In this process, as shown in FIG. 4, the horizontal support part 120 is bent downward to a lower end of the vertical part 110 at its one end to reinforce the horizontal support part 120.

In addition, the hollow part of the horizontal support part 120 has a dimension that gradually decreases from the center pillar 2 to its either end, i.e., an A or C pillar, to supports the airbag module 10.

Therefore, an airbag tube 16 is sequentially deployed from a rear end, where an inflator 20 is disposed, to a front end of the automobile. At this time, the head liner 4 is first opened by a narrow part 122 of the horizontal support part 120 of the support bracket 100 in a tilted manner.

Figure 6:
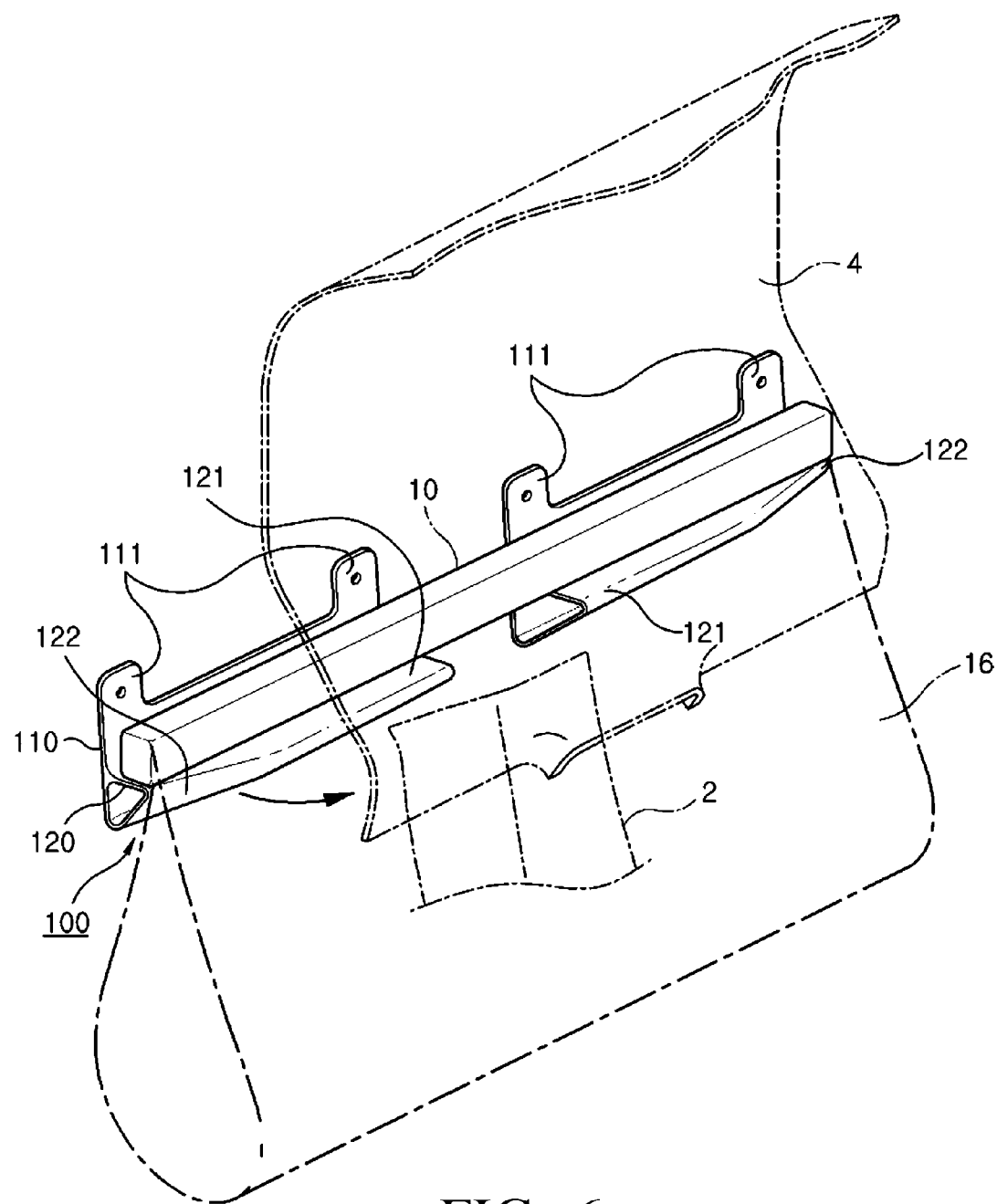
FIG. 6 is a cross-sectional view showing a deployment state of the side airbag in accordance with a first exemplary embodiment of the present invention.

In addition, since the airbag tube 16 is opened by a wide part 121 of the horizontal support part 120 in a straight manner, the head liner 4 is smoothly and rapidly opened in an opening line shape as shown in FIG. 6.

Therefore, the airbag tube 16 is rapidly and stably deployed into the automobile by the smoothly and rapidly opened head liner 4 to protect the driver/passenger from injury.

As described above, the airbag module 10 operates by a large amount of high-pressure gas being introduced from the inflator 20 into the airbag tube 16 folded in the housing such that the airbag tube 16 inflates at a high speed and under high pressure from a rear end, where the inflator 20 is disposed, to a front end of the automobile, thereby detaching and opening a door 12b of the housing 12 from the housing 12.

The expanding airbag tube 16 presses the head liner 4 through the door 12b detached from the housing 12 to open the head liner 4.

Figure 5:
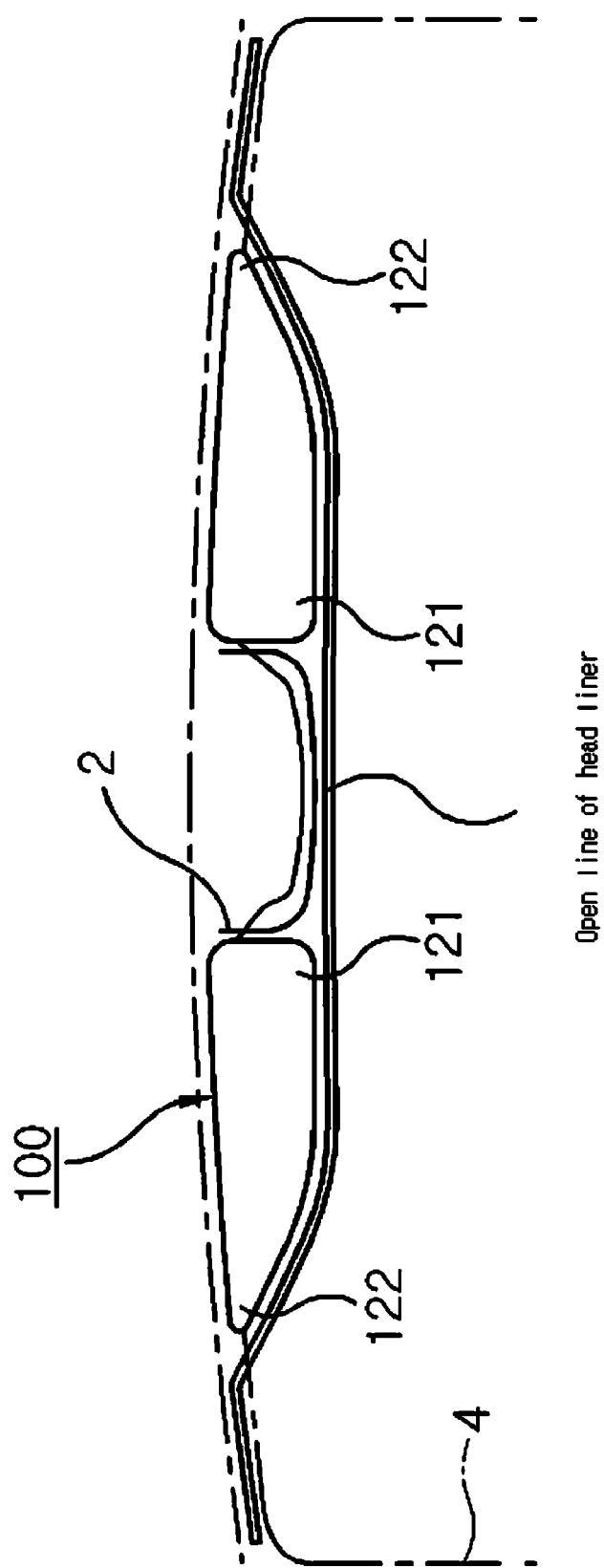
FIG. 5 is a plan view showing an open state of a head liner after deployment of the side airbag in accordance with a first exemplary embodiment of the present invention.

Meanwhile, the head liner 4 is sequentially opened from the rear end, where the inflator 20 is disposed, to the front end of the automobile, similar to the deployment sequence of the airbag tube 16. That is, the head liner 4 is smoothly and rapidly opened by the horizontal support part 120 of the support bracket 100 in sequence of the narrow part 122, the wide part 121, and the narrow part 122, as shown in FIG. 5.

As a result, as shown in FIG. 6, the airbag tube 16 is rapidly and stably deployed into the automobile, and the deployed airbag tube 16 covers the entire inner side part of the automobile, thereby protecting a driver/passenger from injury.

Second Exemplary Embodiment

Hereinafter, a second exemplary embodiment in accordance with the present invention will be described with reference to FIGS. 7 to 10.

An airbag module 10A has an airbag housing 12 in which an airbag tube 16 is disposed. The airbag housing 12 has a mounting part 12a bolted to a chassis, i.e., an inner panel 6, between a roof panel (not shown) and a head liner 4.

The airbag housing 12 bolted to the inner panel 6 is disposed adjacent to a boundary between a center pillar 2 and the head liner 4.

In addition, the airbag housing 12 has a door 12b installed at its one surface opposite to the head liner 4 and opened by the inflating airbag tube 16.

Further, the door 12b is detached and opened from the housing 12 at its lower end when the airbag tube 16 is deployed. The door 12b has a tear line 13a having an approximately "V" shape groove and formed along the lower end and both side ends to facilitate detachment of the door 12b.

Furthermore, the airbag housing 12 has a hollow shock absorption part 130 integrally formed with a lower part of the housing 12 adjacent to the center pillar 2, both of its ends open, and in contact with the inner panel 6.

In addition, the shock absorption part 130 has an upper surface 132 functioning as a bottom surface of the housing 12, a vertical surface 136 extending from one end of the upper surface 132 and in fixed contact with the inner panel 6, and a wrinkled part 134 connecting the other end of the upper surface 132 and a lower end of the vertical surface 136.

At this time, the shock absorption part 130 may be formed of the same material as the housing 12, which is preferably a flexible material having a predetermined elasticity for smooth compression and shock absorption of the wrinkled part 134.

Therefore, the airbag tube 15 is deployed as the wrinkled part 134 is compressed and the upper surface of the shock absorption part 130 is pushed downward. The shock absorption part 130 is instantly deformed and restored to absorb shock by compression of the wrinkled part 134 and the shock absorption of the shock absorption part 130.

Figure 7:
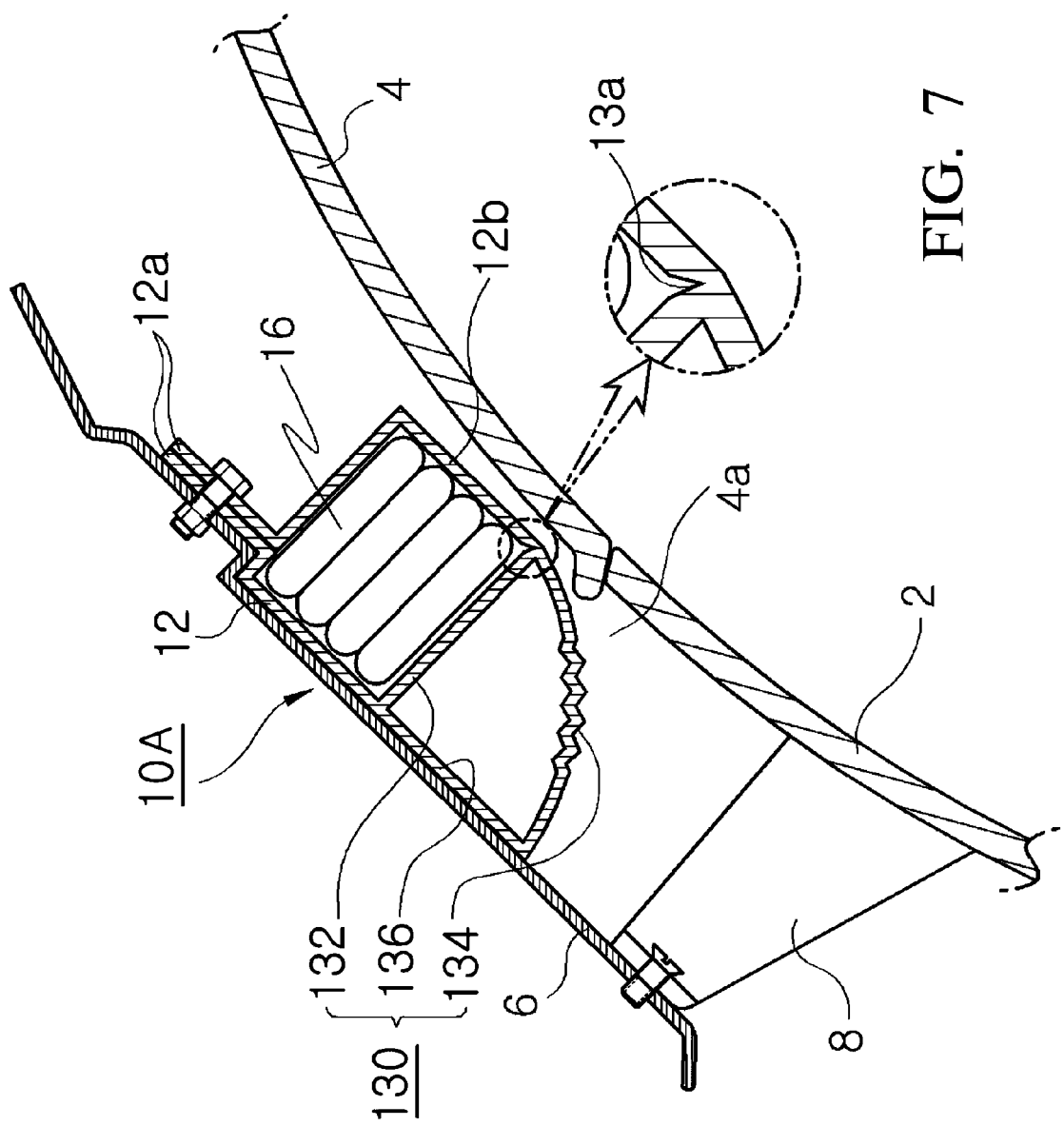
FIG. 7 is a cross-sectional view showing an installation state of an automobile side airbag in accordance with a second exemplary embodiment of the present invention.

As shown in FIG. 7, the upper surface of the shock absorption part 130 is disposed at the same level as the upper end of the center pillar 2, or higher, thereby preventing interference between the deployed airbag tube 16 and the center pillar 2.

Therefore, since the airbag tube 16 is deployed at high speed and high pressure to prevent interference by the center pillar 2, the airbag tube 16 can be stably deployed into a space between the center pillar 2 and the inner panel 6.

In addition, in order to stably guide deployment of the airbag tube 16, the lower end of the head liner 4 in contact with the center pillar 2 has a circular shape such that the head liner 4 can be readily detached from the center pillar 2 when the airbag tube 16 is deployed.

Figure 8:
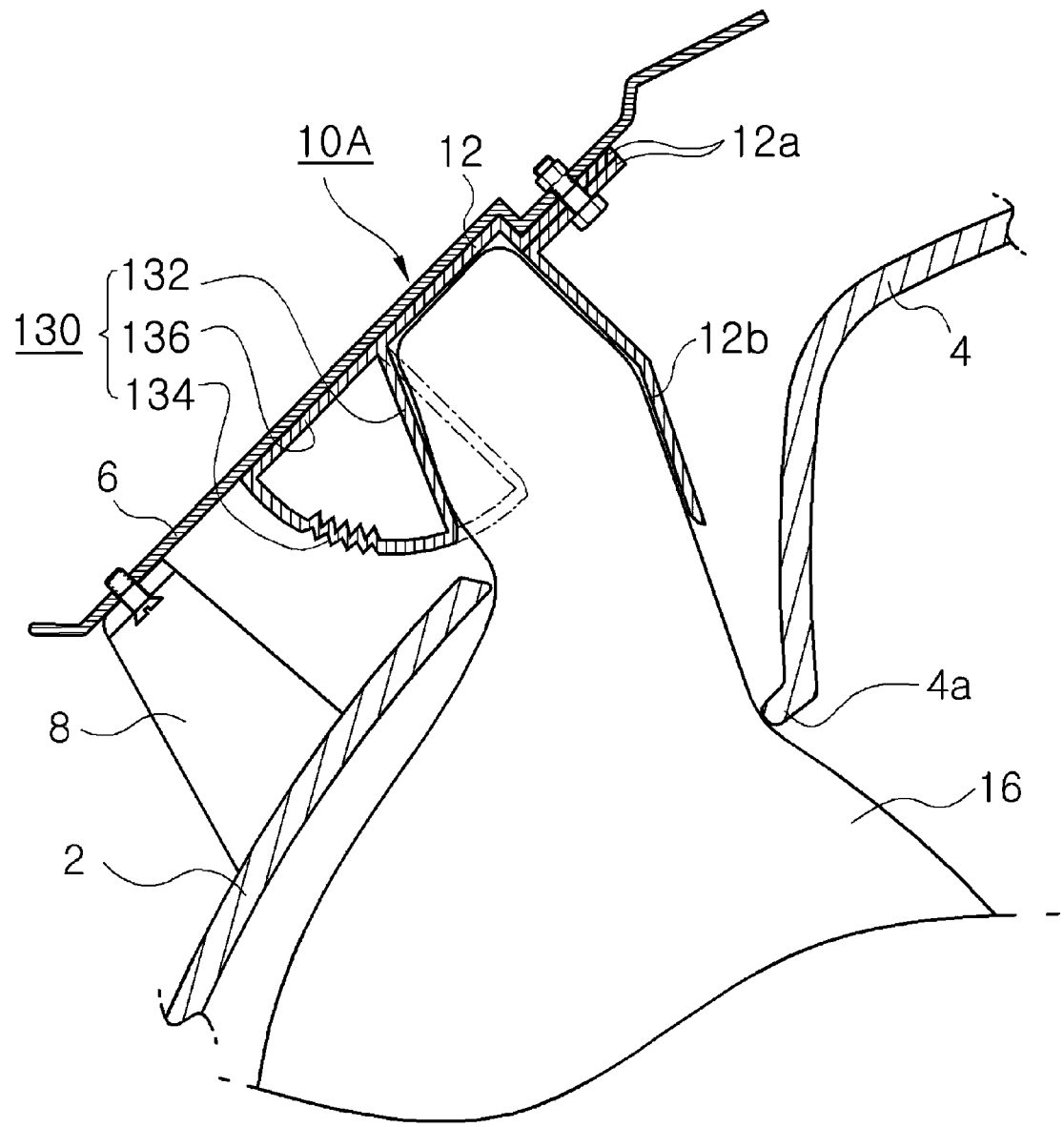
FIG. 8 is a cross-sectional view showing a deployment state of the automobile side airbag in accordance with the second exemplary embodiment of the present invention.

As shown in FIG. 8, an automobile side airbag guide plate in accordance with the present invention has an airbag housing 12. A large amount of high-pressure gas is introduced from an inflator 20 into an airbag tube 16 folded in the housing 12.

Then, the airbag tube 16 inflates at high speed and high pressure so that a lower part of a door 12*b* of the housing 12 is torn along a tear line 13*a* to be detached from the housing 12 and opened.

The airbag tube 16 forces the door 12*b* of the housing 12, detached and rotated from the housing 12, into contact with the head liner 4 to push the head liner 4 out.

A lower end of the head liner 4 in contact with the center pillar 2 has a circular shape so that the airbag tube 16 is readily separated from an upper end of the center pillar 2 to be stably deployed into the automobile.

Expansion force of the airbag tube 16 is transmitted to the shock absorption part 130 formed at a lower part of the housing 12 to compress a wrinkled part 134 formed at a curved surface of the absorption part 130, thereby opening an upper surface 132 of the shock absorption part 130.

Since the upper surface 132 of the shock absorption part 130 is disposed higher than the upper end of the center pillar 2, the airbag tube 16 can be rapidly and smoothly deployed into the automobile without interference by the center pillar 2 to protect the driver/passenger from injury.

Figure 9:
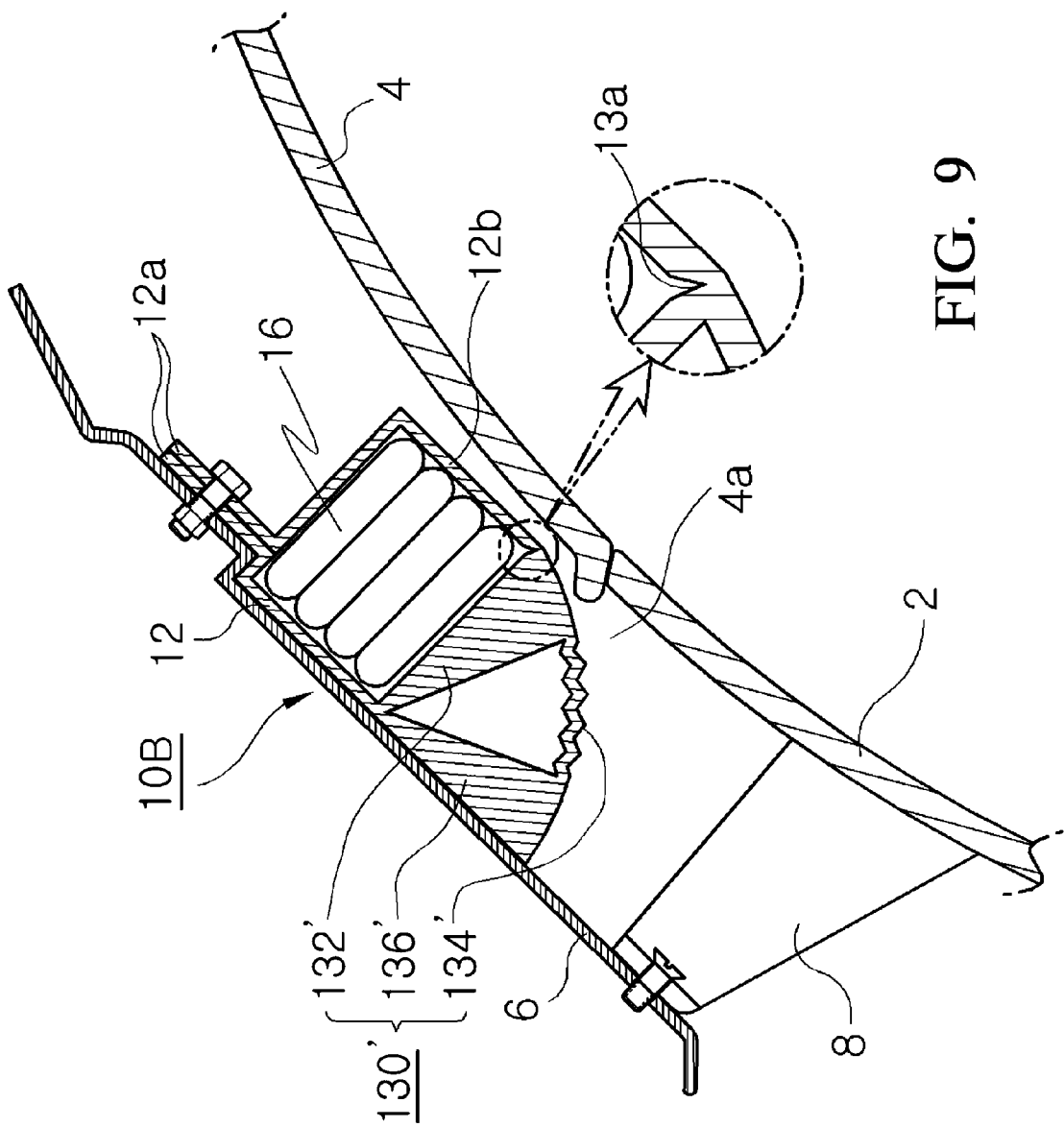
FIG. 9 is a cross-sectional view of a modification of a shock absorption part of an automobile side airbag in accordance with the second exemplary embodiment of the present invention.
Figure 10:
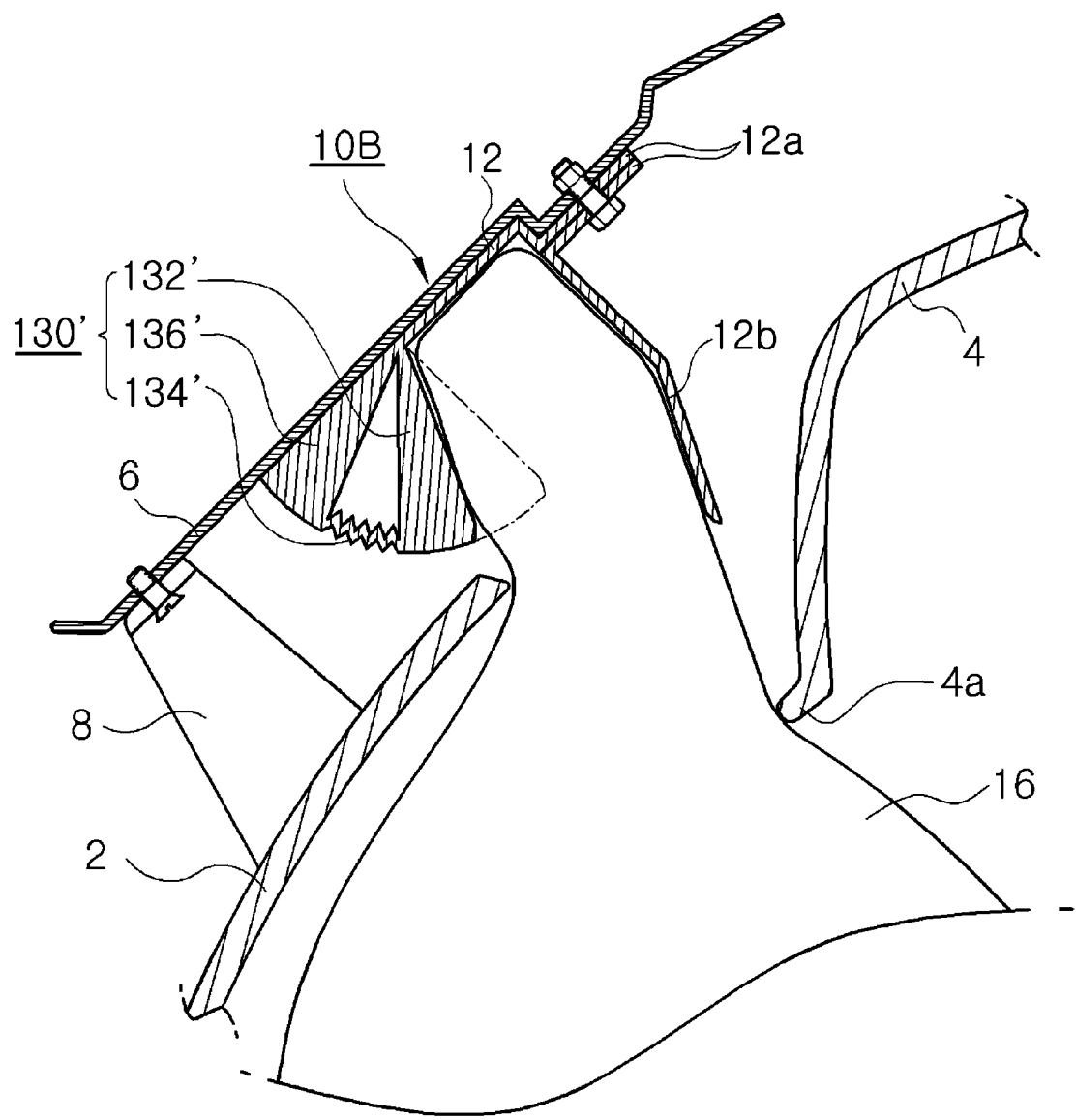
FIG. 10 is a cross-sectional view showing a deployment state of the automobile side airbag of FIG. 9.

Meanwhile, FIGS. 9 and 10 illustrate the shock absorption part of the side airbag guide plate in accordance with another exemplary embodiment of the present invention. The same elements as in the above-described exemplary embodiments are designated by the same reference numerals and their description will not be repeated.

As shown in FIG. 9, the shock absorption part 130' has an upper surface 132' and a vertical surface 136' extending to both ends of a wrinkled part 134 to form thick parts. In addition, as shown in FIG. 10, the thick parts absorb shock applied to the shock absorption part 130' to prevent damage and breakage of the shock absorption part 130', without hindering compressing of the wrinkled part 134 when the airbag module 10B is deployed.

Therefore, the thick upper and vertical surfaces 132' and 136' reinforce the entire shock absorption part 130'.

Third Exemplary Embodiment

Hereinafter, a third exemplary embodiment in accordance with the present invention will be described with reference to FIGS. 11 to 14.

As shown in FIGS. 11 to 14, an airbag module 10C of the third exemplary embodiment includes an airbag tube 16 folded several times therein, an airbag housing 12, in which the airbag tube 16 is disposed, the airbag housing 12 having a door 12*b* formed at its one side and a mounting part 12*a* fixed to an inner panel 6 through a bolt at its upper end, and an inflator 20 connected to a rear end of the airbag tube 16 to inject a large amount of high-pressure gas thereinto.

Figure 11:
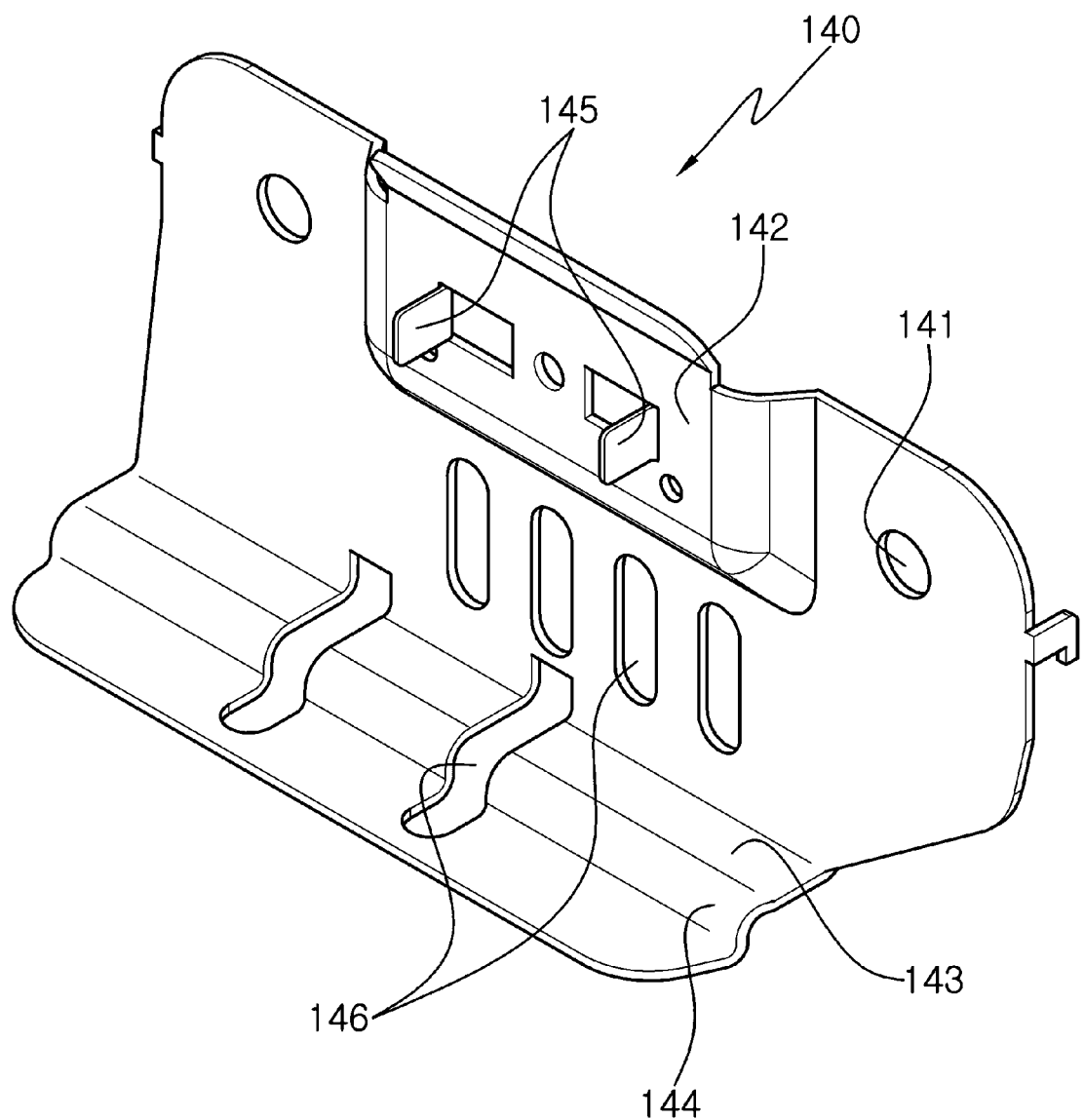
FIG. 11 is a perspective view of a side airbag guide plate in accordance with a third exemplary embodiment of the present invention.
Figure 12:
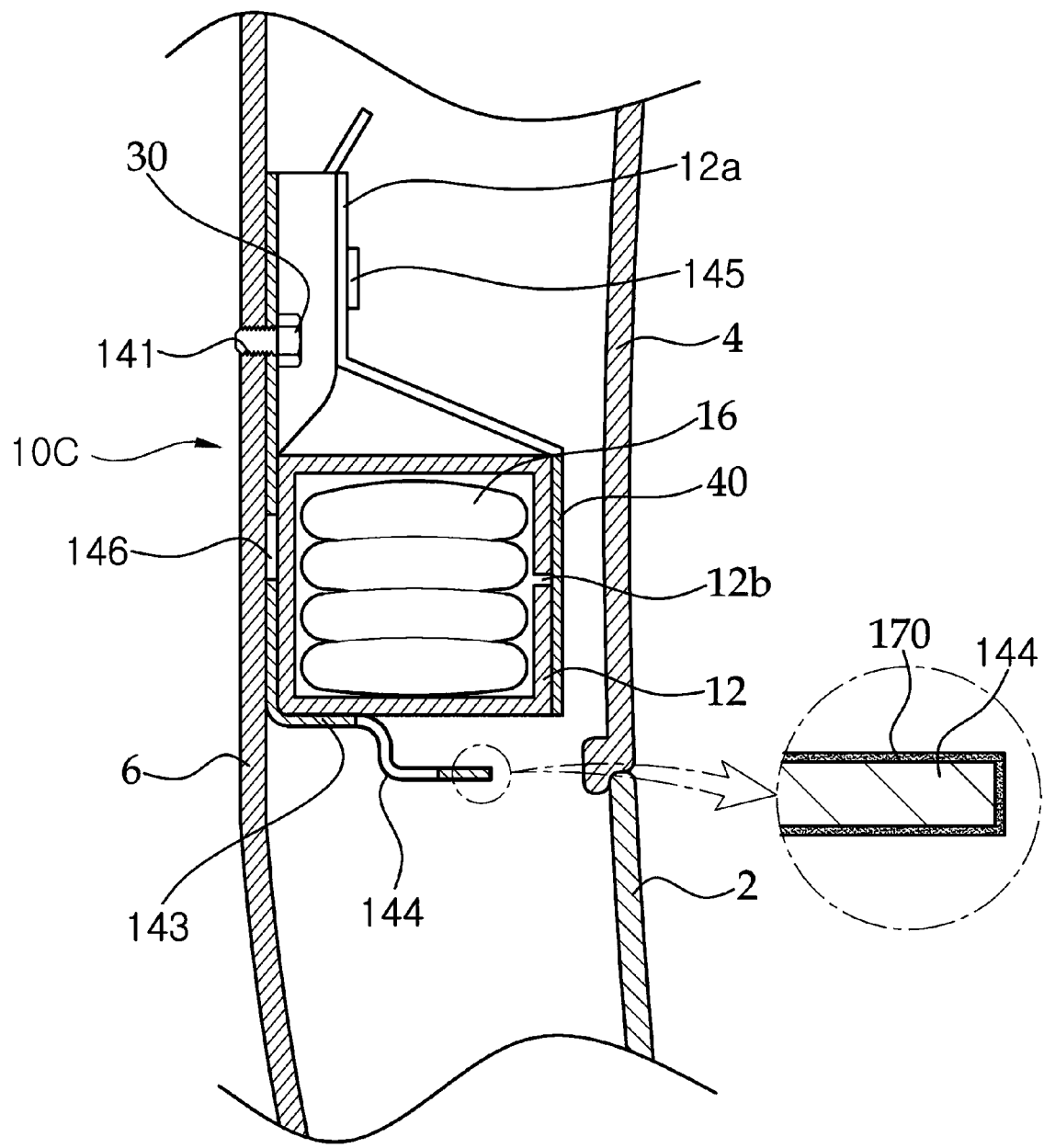
FIG. 12 is a cross-sectional view of the side airbag guide plate in accordance with the third exemplary embodiment of the present invention.

In this process, as shown in FIGS. 11 and 12, the side airbag guide plate in accordance with the present invention resiliently supports a bottom surface of the airbag housing 12 of the airbag module 10C to stably guide the airbag tube into the automobile when the airbag tube 16 inflates.

In addition, the guide plate 140 is formed of a metal material, and has insertion holes 141 through which the guide plate 140 is fixed to an inner panel 6 by bolts. A projection 142 is formed between the insertion holes 141 to be in close contact with one surface of the airbag housing 12, and a support part 143 is bent from a lower end of the guide plate 140 to support a lower surface of the airbag housing 12.

In this process, the support part 143 has a bent part 144 longitudinally extending in an "L" shape from one surface thereof. The bent part 144 absorbs shock generated when the lower part of the door 12*b* of the airbag housing 12 is instantly bent and restored upon expansion of the airbag tube 16, thereby preventing damage and deformation of the support part 143.

The bent part 144 may have a height such that the door 12*b* of the airbag housing 12 is disposed at a level higher than or the same as the upper end of the center pillar 2 when the airbag tube 16 is deployed.

When the door 12*b* of the airbag housing 12 is bent downward by the bent part 144, a lower part of the door 12*b* should be disposed at a lever higher than or the same as the upper end of the center pillar 2 to prevent the airbag tube 16 from being deployed between the inner panel 6 and the center pillar 2.

In addition, the guide plate 140 has a plurality of elongated holes 146 to reduce its weight and material cost.

The guide plate 140 has fixing pieces 145 bent from the projection 142 and between which a fixing plate 40 is inserted to fix the airbag housing 12.

The fixing pieces 145 are formed by punching three sides of the projection 142 using a punching machine and bending it toward the airbag housing 12 by 90°. Then, the fixing plate 40 for fixing the airbag housing 12 is inserted between the fixing pieces 145 through grooves formed at a surface of the fixing plate 40, and the fixing pieces 145 are bent onto the fixing plate 40 by 90° again, thereby fixing the fixing plate 40.

Hereinafter, assembly and use of the side airbag guide plate as constituted above will be described in detail.

An operator fixes the support part 130 of the guide plate 140 to the inner panel 6 through the insertion holes 141 using the fixing means 30.

Then, the groove of the fixing plate 40 for fixing the airbag housing 12 is inserted between the fixing pieces 145 of the guide plate 140, and the fixing pieces 145 are bent to fix the fixing plate 40, thereby completing fixation of the airbag module 10C using the guide plate 140 and the fixing plate 40.

Next, when a large amount of high-pressure gas is injected into the airbag tube 16 from the inflator 20 upon collision of the automobile, the airbag tube 16 expands and is deployed through the door 12*b* of the airbag housing 12 into the automobile through the head liner 4.

At this time, rotation of the lower part of the door 12*b* is limited by the support part 143 of the guide plate 140 to prevent entry of the airbag tube 16 between the center pillar 2 and the inner panel 6.

Figure 13:
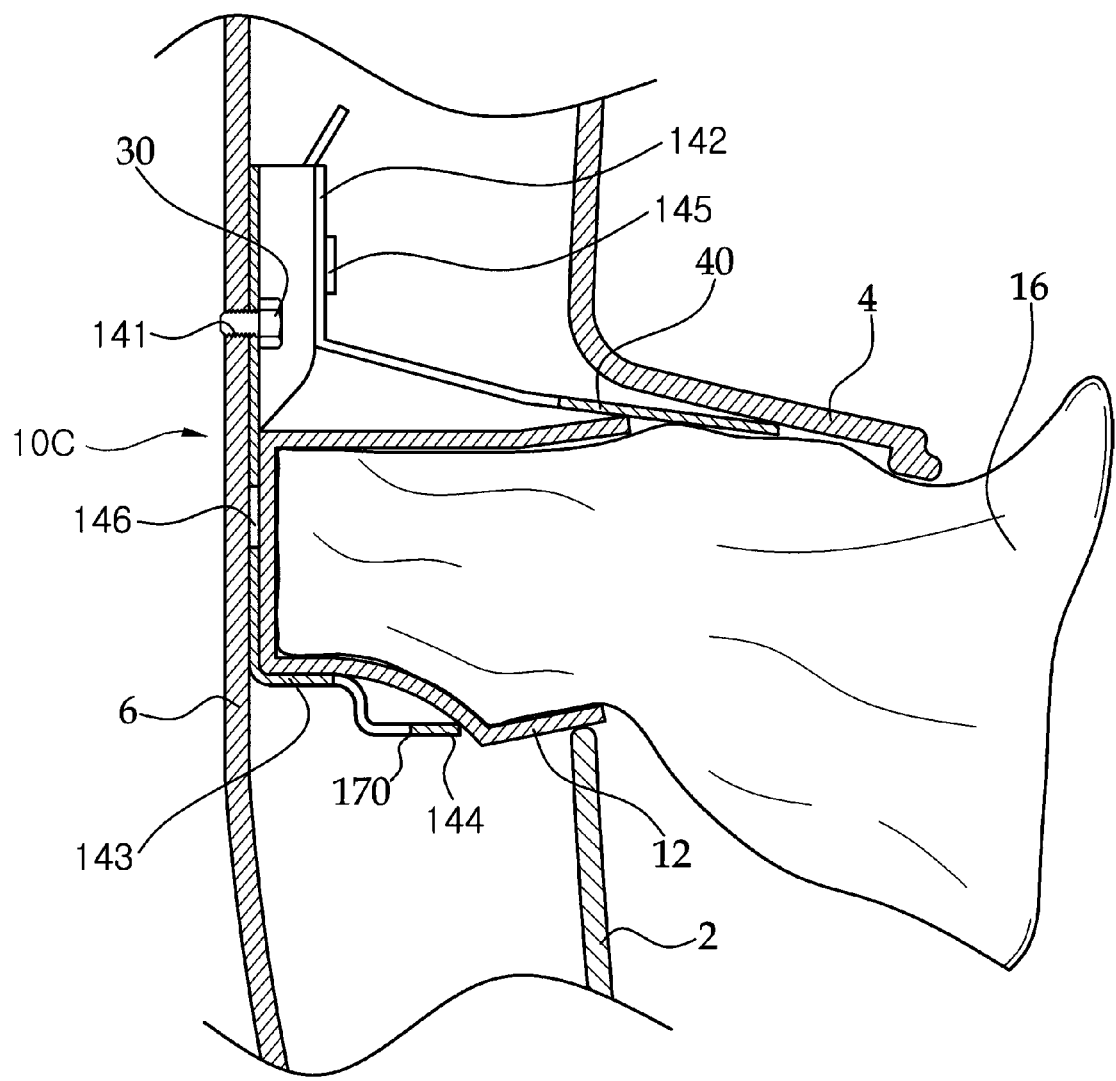
FIG. 13 is a cross-sectional view showing a deployment state of an airbag tube of FIG. 12.

Therefore, as shown in FIG. 13, when high-pressure gas is injected into the airbag tube 16, it is possible to absorb shock generated when the lower part of the door 12*b* is instantly bent and restored by the bent part 144 of the guide plate 140, and thus enable more stable deployment of the airbag tube 16.

Figure 14:
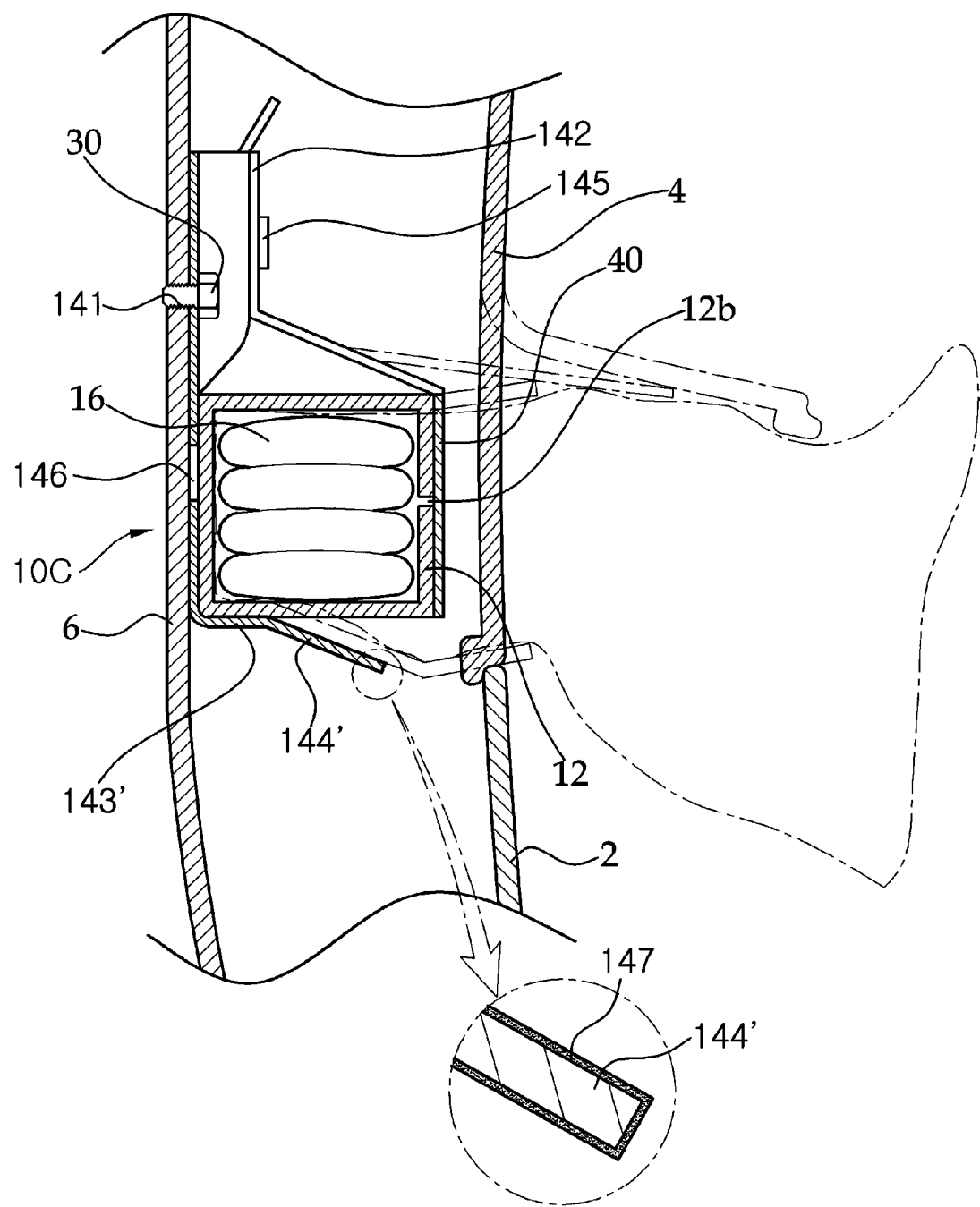
FIG. 14 is a cross-sectional view of a bent part in accordance with the third exemplary embodiment of the present invention.

FIG. 14 illustrates a bent part in accordance with another exemplary embodiment of the present invention. The bent part 144' is bent from one side of a support part 143' in a tilted manner.

The bent part 144' is guided when a lower part of the door 12*b* of the airbag housing 12 is broken off, thereby preventing deformation or damage of the lower part 12*b* due to instant bending.

In addition, a coating layer 170 may be formed on a surface of the guide plate 140. The coating layer 170 may be formed of synthetic resin or fabric, and covers the support part 143 or 143' of the guide plate 140 and the bent part 144 or 144', thereby preventing damage or tearing thereof due to sharp parts.

Fourth Exemplary Embodiment

Hereinafter, a fourth exemplary embodiment in accordance with the present invention will be described with reference to FIGS. 15 to 18.

As shown, an airbag module 10D installed in a roof side panel 200 is fixed to a front pillar 500 at its front part through the medium of a buckle, and connected to a rear pillar 700 at its rear part, in which an inflator 20 is installed. Also, a guide plate 300 is installed at the roof side panel 200 on the center pillar 2, and a side airbag housing 12 is disposed on a support part 330 of the guide plate 300.

While not shown, the airbag module 10D includes a sensor for detecting a collision, and an electronic control unit for receiving a signal from the sensor and operating the inflator 20.

Figure 15:
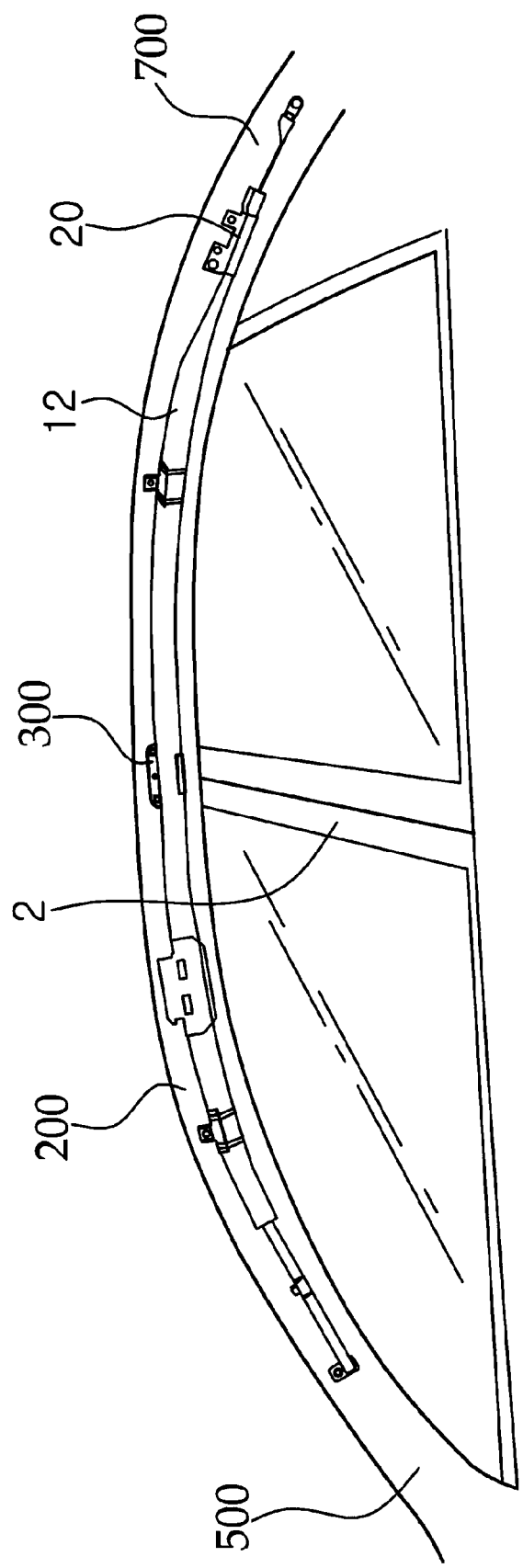
FIG. 15 is a front view showing an installation position of a guide plate in accordance with a fourth exemplary embodiment of the present invention.
Figure 16:
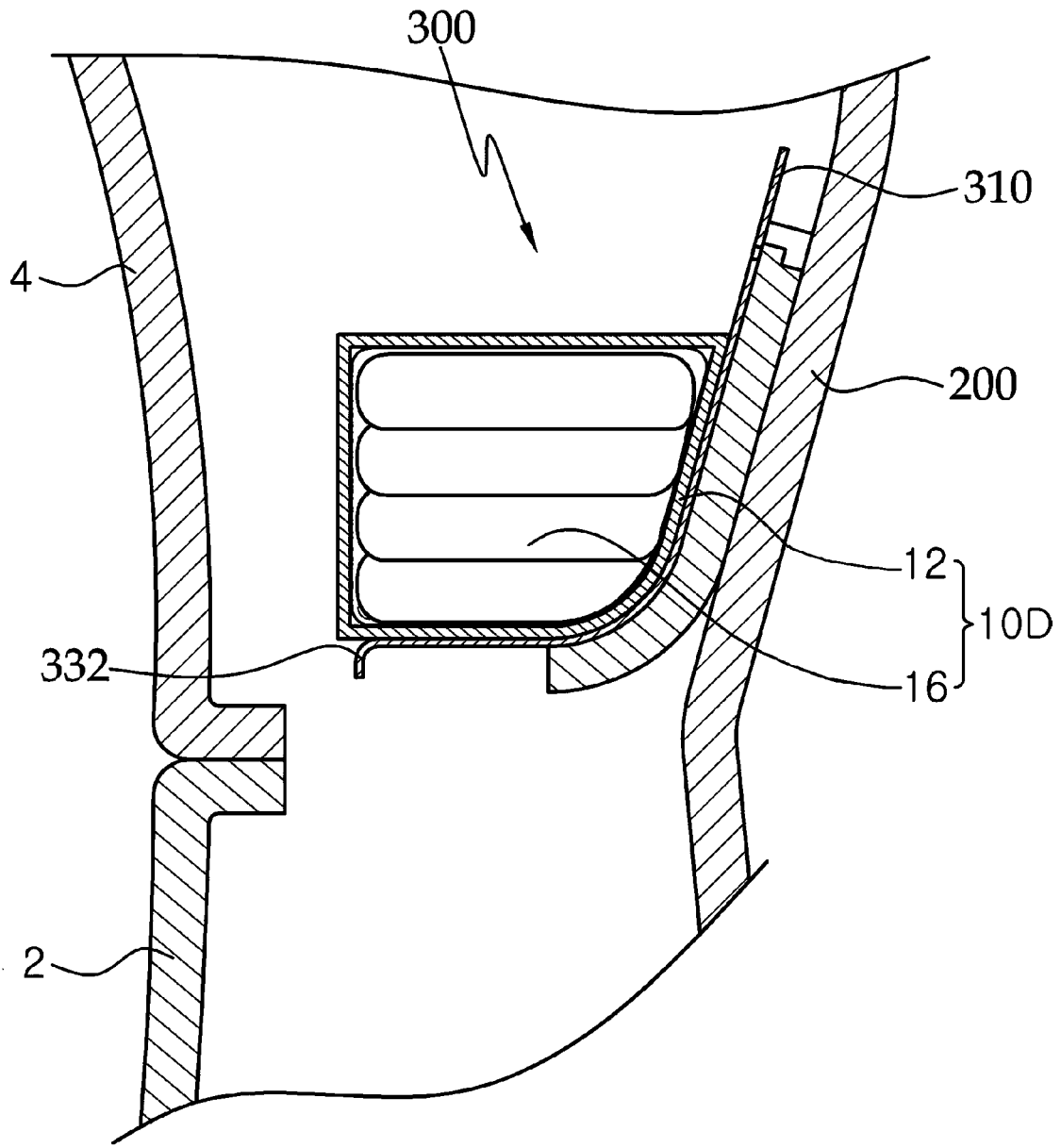
FIG. 16 is a cross-sectional view showing an installation structure of the guide plate in accordance with the fourth exemplary embodiment of the present invention.

As shown in FIGS. 15 and 16, the guide plate 300 is disposed between the roof side panel 200 and the head liner 4, and fixed to the roof side panel 200.

The guide plate 300 has a support part 330 bent from a lower part of the fixing member 310, and fixed to the roof side panel 200 through an installation hole 311 formed at the fixing member 310 using a bolt.

In addition, fixing hooks 312 formed at both sides of the installation hole 311 are hooked and fixed to hooking grooves (not shown) formed at the roof side panel 200 to prevent the guide plate 300 from being rotated, thereby improving stability of the guide plate 300.

Meanwhile, the support part 330 has a guide part 332 formed at its one end and bent downward, thereby preventing the airbag module 10D from being deployed between the roof side panel 200 and the head liner 4.

Figure 17:
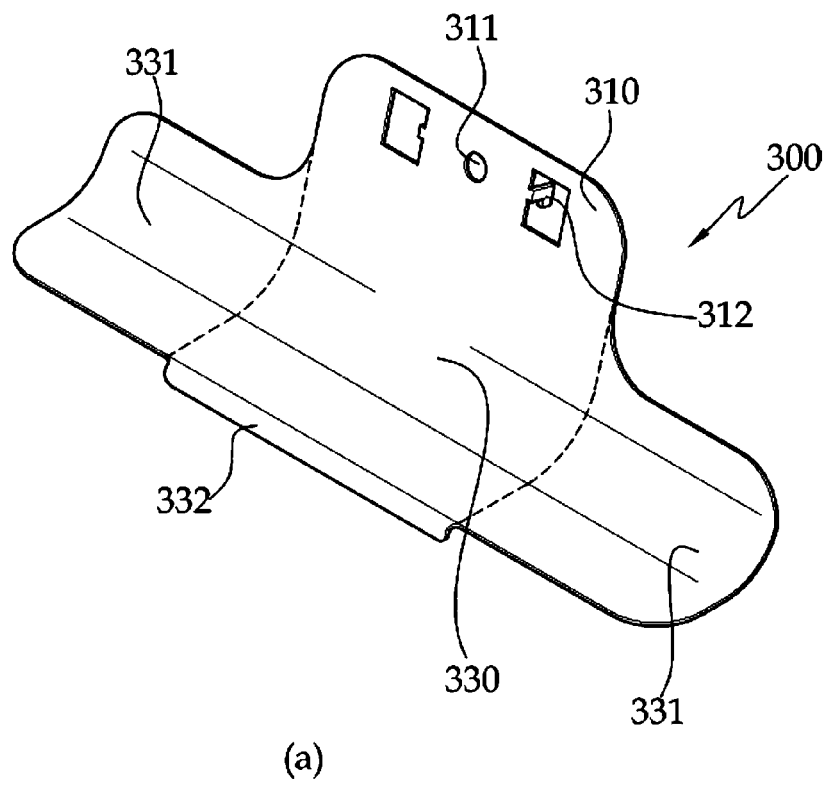
FIG. 17 is a perspective view of a guide plate in accordance with the fourth exemplary embodiment of the present invention.
Figure 17:
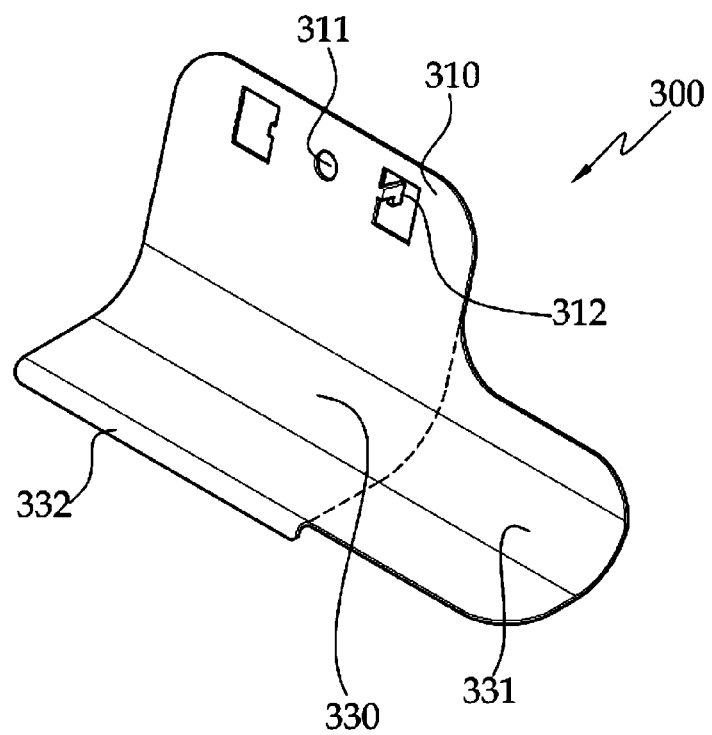

Describing the guide plate 300 in detail with reference to FIG. 17, the guide plate 300 includes a fixing member 310 for installing the guide plate 300 at the roof side panel 200, and a support part 330 smoothly bent from the fixing member 310 and having extension parts 331.

In addition, the fixing member 310 has an installation hole 311, through which a bolt passes, when the guide plate 300 is mounted on the roof side panel 200. Rectangular holes are formed at both sides of the installation hole 311, and fixing hooks 312 are bent from one side of the rectangular holes.

Here, the support part 330 is bent from the guide plate 300 and disposed opposite to the fixing member 310, and the extension parts 331 extend from both sides of the support part 330 to facilitate sequential deployment of the airbag.

Meanwhile, the extended part 331 may be formed at one side of the support plate 330, at which the inflator 20 is disposed (see FIG. 17B).

In addition, a guide part 332 is bent at a right angle to an end of the support part 330 such that the airbag module 10D opens the head liner 4 for deployment into the automobile not into the center pillar.

Figure 18:
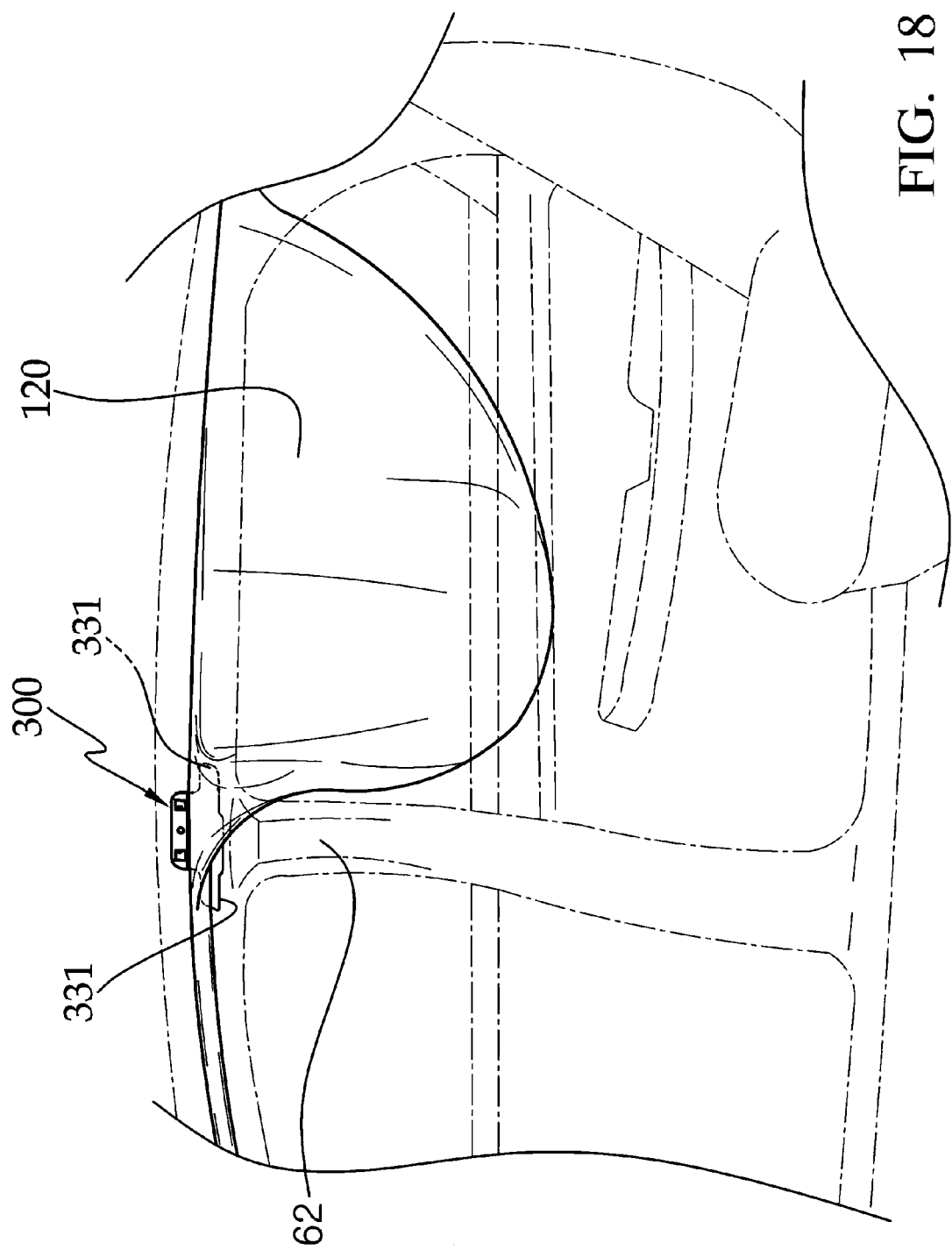
FIG. 18 is a cross-sectional view showing a deployment state of a side airbag having the guide plate in accordance with the fourth exemplary embodiment of the present invention.

Further, as shown in FIG. 18, when the automobile collides with an object, high-pressure gas is injected into the airbag tube 16 in response to a signal from a sensor such that the airbag tube rapidly expands into the automobile.

At this time, the airbag tube 16 initially expands from a side of the inflator to open the head liner 45, thereby being deployed into the automobile. The extension parts 331 formed at the guide plate 300 disposed at the center pillar 2 guide deployment of the airbag module 10D into the automobile.

That is, the airbag module 10D is deployed by the extension parts 331 at a certain angle.

Since the airbag module 10D is deployed toward an opposite door before arriving at the center pillar 2, it is possible to deploy the airbag tube into the automobile without interference by the projected center pillar 2. Then, the airbag tube is sequentially deployed toward a bottom of the automobile just behind the projected center pillar 2 to protect the driver/passenger.

In addition, the guide part 332 functions to prevent the airbag module 10D from being deployed inside the center pillar 2, and guide the airbag module 10D into the automobile without interference by an end of the center pillar 2.

As can be seen from the foregoing, a side airbag guide plate in accordance with the present invention enables smooth and rapid opening of a head liner using a support bracket when an airbag tube is deployed, thus facilitating rapid and stable deployment of the airbag tube into the automobile to protect the driver/passenger from injury.

In addition, it is possible to prevent damage of an airbag housing upon deployment of the airbag tube using a shock absorption part. The shock absorption part of the airbag housing also guides deployment of the airbag tube. Specifically, the shock absorption part has a stable deployment angle (obtained by full compression) during initial deployment of the airbag tube, and a smooth deployment angle (resulting from partial restoration after shock absorption) during intermediate deployment or after deployment, thereby facilitating smooth deployment of the airbag tube.

Further, a support part of the guide plate supports a lower surface of the side airbag to stably introduce the airbag tube into the automobile upon deployment thereof. Furthermore, if the support part is broken, it can be easily fixed or replaced. In addition, extension parts of the guide plate guide deployment of the side airbag to prevent interference by the center pillar, thereby facilitating smooth, orderly deployment of the side airbag.

While this invention has been described with reference to exemplary embodiments thereof, it will be clear to those of ordinary skill in the art to which the invention pertains that various modifications may be made to the described exemplary embodiments without departing from the spirit and scope of the invention as defined in the appended claims and their equivalents.

What is claimed is:

1. An automobile side airbag guide plate comprising an airbag housing having an airbag tube, a door, and a guide plate,
   wherein the airbag tube is installed in the airbag housing and disposed at a boundary between a center pillar and a head liner,
   the door is opened at one side by the deployed airbag tube,
   the guide plate is fixed to an inner panel at its one side using a fixing means, and
   the guide plate has a support part bent from a lower end thereof, the support part including a bent part, the bent part being bent in a longitudinal direction thereof away from a lower surface of the airbag housing, the bent part being located within a width-wise extent of the lower surface of the airbag housing prior to discharged of the airbag tube from the airbag housing.

2. The side airbag guide plate according to claim 1, wherein the a bent part bent to form an "L" shape.

3. The side airbag guide plate according to claim 2, wherein the bent part has a height such that the door of the airbag housing is disposed at a level higher than or equal to an upper end of the center pillar upon deployment of the airbag tube.

4. The side airbag guide plate according to claim 3, wherein the guide plate has a plurality of elongated holes.

5. The side airbag guide plate according to claim 4, wherein the guide plate has a coating layer formed thereon.

6. The side airbag guide plate according to claim 5, wherein the coating layer is formed of synthetic resin or fabric, and
   the coating layer is formed at the support part and the bent part of the guide plate.

7. The side airbag guide plate according to claim 1, wherein the bent part is tilted obliquely relative to the lower surface of the airbag housing.

8. The side airbag guide plate according to claim 7, wherein the bent part has a height such that the door of the airbag housing is disposed at a level higher than or equal to an upper end of the center pillar upon deployment of the airbag tube.

9. The side airbag guide plate according to claim 8, wherein the guide plate has a plurality of elongated holes.

10. The side airbag guide plate according to claim 9, wherein the guide plate has a coating layer formed thereon.

11. The side airbag guide plate according to claim 10, wherein the coating layer is formed of synthetic resin or fabric, and
   the coating layer is formed at the support part and the bent part of the guide plate.

* * * * *